US009838757B2

(12) United States Patent
Chevallier et al.

(10) Patent No.: US 9,838,757 B2
(45) Date of Patent: Dec. 5, 2017

(54) METHOD TO TRANSMIT VIDEO DATA IN A DATA STREAM AND ASSOCIATED METADATA

(75) Inventors: Louis Chevallier, La Meziere (FR); Lionel Oisel, La Nouaye (FR); Francois Le Clerc, L'Hermitage (FR); Frederic Lefebvre, Rennes (FR)

(73) Assignee: Thomson Licensing, Boulogne, Billancourt (FR)

( * ) Notice: Subject to any disclaimer, the term of this patent is extended or adjusted under 35 U.S.C. 154(b) by 1036 days.

(21) Appl. No.: 12/450,863

(22) PCT Filed: Apr. 10, 2008

(86) PCT No.: PCT/EP2008/054384
§ 371 (c)(1),
(2), (4) Date: Oct. 16, 2009

(87) PCT Pub. No.: WO2008/125601
PCT Pub. Date: Oct. 23, 2008

(65) Prior Publication Data
US 2010/0118191 A1 May 13, 2010

(30) Foreign Application Priority Data
Apr. 17, 2007 (EP) .................. 07290475

(51) Int. Cl.
*H04N 7/00* (2011.01)
*H04N 21/8358* (2011.01)
(Continued)

(52) U.S. Cl.
CPC ... *H04N 21/8358* (2013.01); *H04N 21/23892* (2013.01); *H04N 21/8456* (2013.01)

(58) Field of Classification Search
CPC ..................... H04N 19/00781; H04N 7/00
(Continued)

(56) References Cited

U.S. PATENT DOCUMENTS 6,961,954 B1 * 11/2005 Maybury .......... G06F 17/30787
707/999.003
7,844,644 B2 11/2010 Shin
(Continued)

FOREIGN PATENT DOCUMENTS

CN 1666195 9/2005
EP 1542140 6/2005
(Continued)

OTHER PUBLICATIONS

Dekun Zou et al: "Data Hiding in Film Grain", Digital Watermarking Lecture Notes in Computer Science; LNCS, Springer Berlin, Heidelberg, BE. vol. 4283, Jan. 1, 2006, pp. 197-211.
(Continued)

*Primary Examiner* — Yulin Sun
(74) *Attorney, Agent, or Firm* — Jeffrey D. Carter

(57) ABSTRACT

The application concerns a method for transmitting video data in a data stream and associated metadata, said metadata representing associated video data structure. The method comprises the steps of—determining the structure of the video data, —splitting said structure into chunks in an incremental manner, —transmitting said chunks in the data stream at time intervals before the video data it is related to. The application concerns also a method for transmitting fingerprint information associated with video data into a video data stream. The method comprises the steps of: —determining fingerprint associated with at least one frame of said video data, —inserting at least a message into the video stream comprising said fingerprint information.

20 Claims, 2 Drawing Sheets

Figure 1:
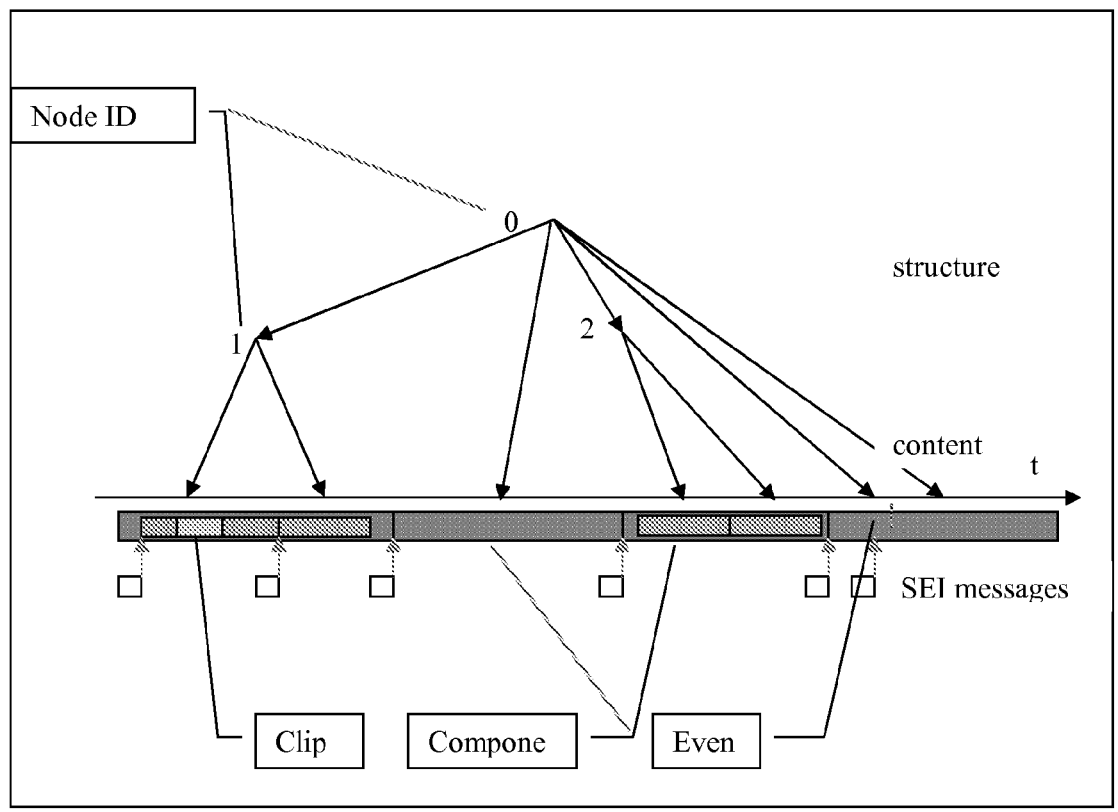

(51) Int. Cl.
*H04N 21/2389* (2011.01)
*H04N 21/845* (2011.01)

(58) Field of Classification Search
USPC .................................................. 375/240.01
See application file for complete search history.

(56) References Cited

U.S. PATENT DOCUMENTS

| | | | | |
|---|---|---|---|---|
| 2002/0035732 | A1* | 3/2002 | Zetts | G11B 27/002 725/148 |
| 2004/0006575 | A1* | 1/2004 | Visharam et al. | 707/104.1 |
| 2005/0216472 | A1* | 9/2005 | Leon et al. | 707/10 |
| 2006/0236342 | A1* | 10/2006 | Kunkel et al. | 725/52 |
| 2007/0030996 | A1* | 2/2007 | Winger et al. | 382/100 |
| 2007/0098007 | A1* | 5/2007 | Prodan et al. | 370/443 |
| 2007/0192863 | A1* | 8/2007 | Kapoor et al. | 726/23 |

FOREIGN PATENT DOCUMENTS

| | | |
|---|---|---|
| JP | 2004180258 | 6/2004 |
| KR | 20040005824 | 1/2004 |
| KR | 20050058912 | 6/2005 |
| WO | WO0227469 | 4/2002 |
| WO | 03098475 A1 | 11/2003 |
| WO | WO2008125601 | 10/2008 |

OTHER PUBLICATIONS

Bordes P. et al.: "SEI for logo insertion" Video Standards and Drafts, No. JVT-Q019r1, Oct. 17, 2005, pp. 1-9.

The International Search Report Dated Jun. 13, 2008 and European Search Report Dated Jul. 27, 2007.

Chen, Zhibo et al., "Video Annotation SEI Message", Joint Video Team (JVT) of ISO/IEC MPEG & ITU-T VCEG (ISO/IEC JTC1/SC29/WG11 and ITU-T SG16 Q.6) 22nd Meeting: Marrakech, Morocco, Jan. 13-19, 2007.

Chen, Zhibo et al., "JVT-V060 Video Annotation SEI Message", Joint Video Team (JVT) of ISO/IEC MPEG & ITU-T VCEG (ISO/IEC JTC1/SC29/WG11 and ITU-T SG16 Q.6) 22nd Meeting: Marrakech, Morocco, Jan. 13-19, 2007.

\* cited by examiner

1

METHOD TO TRANSMIT VIDEO DATA IN A DATA STREAM AND ASSOCIATED METADATA

This application claims the benefit, under 35 U.S.C. §365 of International Application PCT/EP2008/054384, filed Apr. 10, 2008, which was published in accordance with PCT Article 21(2) on Oct. 23, 2008 under international publication number WO2008/125601 on Oct. 23, 2008 in English and which claims the benefit of European patent application No. 07290475.8, filed Apr. 17, 2007.

The invention concerns a method to transmit video data in a data stream and associated metadata, said metadata representing associated video data structure.

The invention concerns also a method to transmit video data in a data stream and associated metadata, said metadata representing fingerprint information associated with said video data structure.

Video annotation information embedded in video bit streams may potentially benefit quite a lot of applications:
  Internet video search,
  Editing material search,
  Storage media indexing and retrieval,
  Video browsing in VOD, channel selection, PVR . . . ,
  Video copy detection,
  Search results clustering.
These applications can be concluded into three categories:
  Requirement of textual annotation into video documents
  Requirement of visual characteristics for visual similarity search
  Requirement of video structure information for video navigation With more and more requirement on supporting more functionality in compressed video streams, H.264/AVC, also referenced as ITU-T H.264 standard, adopted SEI (Supplemental Enhancement Information) messages which can assist in processes related mainly to decoding. Now the standard has defined around 20 types of SEI syntax to support different applications.

The invention proposes a framework of video coding with functional support of video structure and fingerprint.

According to a first aspect, the invention concerns a method for transmitting fingerprint information associated with video data into a video data stream. According to this aspect of the invention, it comprises the steps of:
  determining fingerprint associated with at least one frame of said video data,
  inserting at least a message into the video stream comprising said fingerprint information.

According to a preferred embodiment, said video data is compliant with ITU-T H.264 standard and that said fingerprint information is encapsulated into a Supplemental Enhancement Information (SEI) message.

According to a preferred embodiment, the data structure comprises a plurality of nodes, each node comprising a plurality of leaves, each chunk comprises a plurality of nodes and leaves.

According to a preferred embodiment said video data are encoded and said chunks are encapsulated into messages in the coded video data, said chunk comprising either a description of the nodes comprised in the chunk or an information indicating that said description is comprised in a next chunk.

According to a preferred embodiment, said video data are coded metadata compliant with ITU-T H.264 standard and that said metadata are transmitted into at least a Supplemental Enhancement Information (SEI) message.

According to a preferred embodiment, said information comprised in the description is chosen among:
  a node identifier,
  an indicator indicating if said node is described in said information,
  and if said node is described in the current information,
    a name representing the video information said node is associated with,
    a timecode giving the duration of the video information said node is associated with,
    a number of summary segments,
  And for each summary segment,
    a name representing the summary segment,
    a category representing a semantic information associated with said summary segment,
    a key description describing the type of segment chosen among a keyframe, a clip or a textual description,
  or chosen among any combination of these information.

According to a second aspect the invention concerns the invention proposes a method for transmitting video data in a data stream and associated metadata, said metadata representing associated video data structure. According to this aspect of the invention, the method comprises the steps of:
  determining the structure of the video data,
  splitting said structure into chunks in an incremental manner,
  transmitting said chunks in the data stream at time intervals before the video data it is related to.

According to a third aspect, the invention concerns also a video encoding device comprising
  means for determining the structure of the video data,
  means for splitting said structure into chunks in an incremental manner,
  means for inserting said chunks in the data stream at time intervals before the video data it is related to.

According to a fourth aspect, the invention concerns also a video encoding device comprising
  means for determining fingerprint associated with at least one frame of said video data,
  means for inserting at least a message into the video stream comprising said fingerprint information.

According to a preferred embodiment, the invention concerns also a video encoding device according to the fourth aspect and compliant with ITU-T H.264 standard and that said structure information is encapsulated into a Supplemental Enhancement Information (SEI) message.

According to a preferred embodiment, the video encoding device is compliant with ITU-T H.264 standard and that said fingerprint information is encapsulated into a Supplemental Enhancement Information (SEI) message.

According to a fifth aspect, the invention concerns also a personal video recorder characterized in that it comprises
  means for decoding encoded video information,
  means for decoding associated video data structure inserted into the encoded video data in a incremental manner,
  means to rebuild the video data structure thanks to the incremental video data structure received on the fly.

According to an sixth aspect, the invention concerns also a personal video recorder characterized in that it comprises
  means for decoding encoded video information,
  means for decoding fingerprint information comprised into the encoded video data,
  means for storing received encoded video data,
  means to compare a plurality of recorded videos data based on their fingerprint information.

Other characteristics and advantages of the invention will appear through the description of a non-limiting embodiment of the invention, which will be illustrated, with the help of the enclosed drawing.

Figure 2:
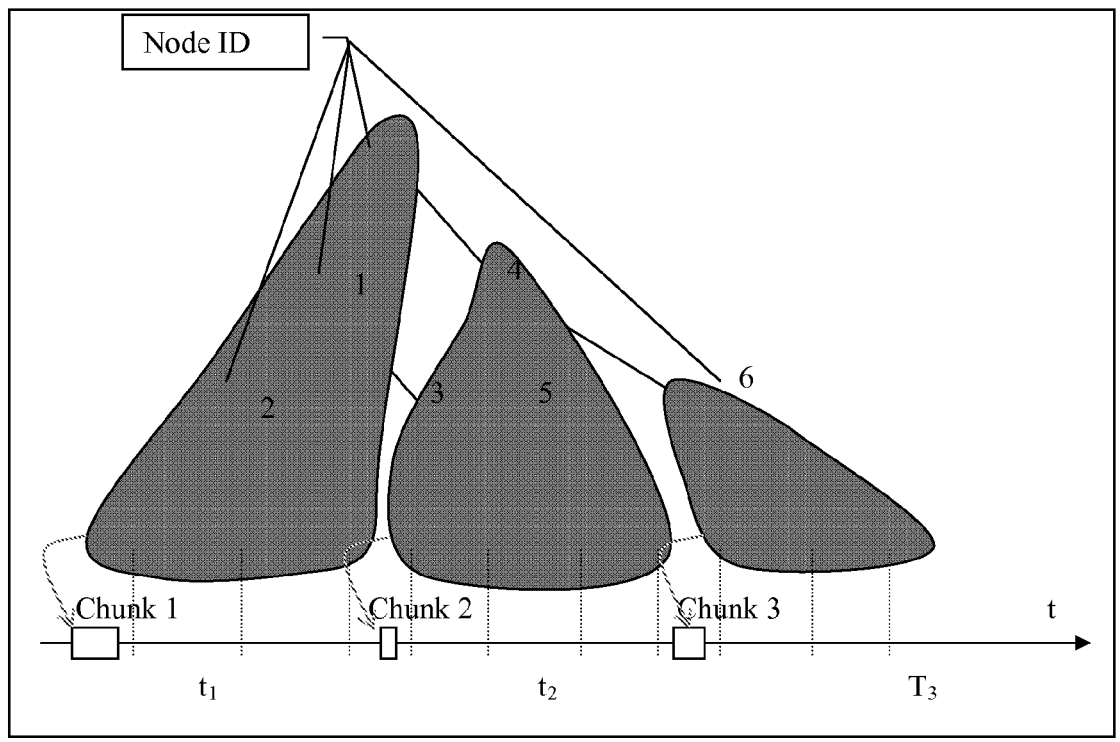

FIG. 1 represents a structure information of a video according to a preferred embodiment of the invention, FIG. 2 represents the incremental decomposition of the video according to a preferred embodiment of the invention.

The Video Structure description consists in the description of the semantic organization of any audiovisual document. This description is a hierarchical structure which provides a top down decomposition of documents.

This information may be used for displaying short summary of the documents or for quickly navigates the documents.

The video structure describes a hierarchical construct. According to the type of document, the method used to obtain the structure of the document may differ. If the video represents a tennis game the structure is different from a football game, and it is also different if the video is representing a film. Several known methods exist for obtaining the structure of a video.

FIG. 1 represents an obtained structure of a video. This structure is represented as a hierarchical decomposition of the video represented by a tree comprising nodes and leaves. The number of nodes and leaves depend on the video content and on its length. The Depth of the tree depends on the content typically. The lowest level of the tree corresponds to the highest granularity of the structure decomposition. For instance in a tennis match, the lowest level can correspond to a point.

As illustrated on FIG. 1, the lowest level of the tree can correspond either to clips (a small video), or also to keyframes directly. With lower granularity, one can assume that the lowest level can correspond to games as far as tennis is concerned.

In the broadcast domain, decoders may start receiving the stream at any point of the streams. In order for them to take advantage of this structure information, the whole tree description has to be repeated along the stream. The problem with this solution is that this may represent some redundancy and may consume too much bandwidth.

The invention therefore proposes to split the structure information into chunks as illustrated on FIG. 2.

The proposed syntax makes it possible to transmit the graph in an incremental manner as the streams flows.

The idea is to split the tree description using a plurality of chunks that are transmitted at successive points in time.

Every chunk is supposed to be transmitted before the corresponding portion of video content.

On FIG. 2, the tree is split in 3 chunks. The node id makes it possible to reconstruct the whole tree in the decoder memory.

At instant t1, a message is inserted into the stream indicating the structure of the next incoming video. This structure is represented in the chunk 1.

At instant t2, a message is inserted into the stream indicating the structure of the next incoming video. This structure is represented in the chunk 2.

At instant t3, a message is inserted into the stream indicating the structure of the next incoming video. This structure is represented in the chunk 3.

When the data are coded according to ITU-T H.264, the structure information is encapsulated into a supplemental Enhancement Information (SEI) message.

The structure of the SEI message is given in the following table:

TABLE 1

| Structure_metadata ( ) { | C | Descriptor |
|---|---|---|
| Node Id<br>The unique number (in the scope of the document) associated to this component | | int(16) |
| Reference<br>a Boolean, if true the component has been or will be described in another message, otherwise the rest of description follows | | b(8) |
| If (!reference) {<br>  Name<br>  a descriptive text of the component<br>  same structure as text_metadata message<br>  Duration<br>  begin timecode - End timecode<br>  same format as timecode (see fingerprint metadata description)<br>  encompasses the whole component<br>  S<br>  Number of summary segments<br>  for( i = 0 i < S, i++ ) {<br>    Name<br>    a descriptive text of the segment<br>    same structure as text_metadata message<br>    Category<br>    Indicates the category of the segment. To be described in a list<br>    The list include generic entry (SHOT, SCENE, EVENT,<br>    NEWS_STORY) and more specific ones (GOAL, MATCH, GAME,<br>    SET)<br>    KeyDescription<br>    0 means a keyframe<br>    1 means a clip (a sequence present in the document described by<br>    in/out timecode)<br>    2 means textual description<br>    Switch (KeyDescription) {<br>    Case 0 :<br>      Keyframe location<br>      The keyframe is to be extracted from the video content<br>      same format as timecode | | int(16)<br><br><br><br><br>int(16)<br><br><br>b(8) |

TABLE 1-continued

| Structure_metadata ( ) { | C | Descriptor |
|---|---|---|
|   Case 1 : | | |
|     Clip | | |
|       begin timecode - End timecode | | |
|       same format as timecode | | |
|   Case 2 : | | |
|     Free textual description | | |
|       same structure as text_metadata message | | |
|   } | | |
|   N | | int(16) |
|   Number of embedded components (possibly 0) | | |
|   for( i = 0 i < N, i++ ) { | | |
|     This syntax is recursive. | | |
|     The structure which goes here has same structure as | | |
|     Structure_metadata itself. | | |
|   } | | |
| } | | |

The field "reference" indicates if a given node is described in the current message or is described in a future message.

According to another embodiment of the invention, all the chunks can also be transmitted at the beginning of the broadcasted video. This enables the whole structure to be available at the beginning of the broadcasted video in the decoder.

In a preferred embodiment, each chunk is transmitted once in a SEI message before the NALs comprising the video said SEI message applies to.

Each SEI message comprises a timecode indicating the absolute value of the video information it refers to as a start information and an end information. In order to be meaningful for the user when navigating into the document, each segment is represented by a name and also each segment can be identified by a specific identifier such as SHOT, SCENE, EVENT, NEWS_STORY, this gives the granularity of the segment. Each segment can also be identified using a semantic information representative of the content of the video and for instance, GOAL, MATCH, GAME, SET. This last metadata giving information for video indexing application.

A key description field indicates also the granularity of the segment, if it is a keyframe, a video clip, or a textual description of the segment comprising for instance a very important declaration from an important person known over ages;

The syntax of the SEI message is recursive as a tree structure is recursive.

A number N of embedded components in the chunk is also given.

So, when receiving one after the others the chunks, embedded in the data stream, it is possible to rebuild the whole structure of the video data as each chunk is not independent from the others but completely linked thanks to the syntax described in table 1 and the node identifiers.

Now, we are going to describe the second aspect of the invention which proposes a method to transmit fingerprint information with the video.

Video Fingerprinting is a technology that makes it possible to detect that 2 video documents probably contain the same content or fragment of content. It is able to cope with content which have been altered (purposely or not). Those alterations include:

Cropping,

Compression,

Rotation,

Some image alteration (blur . . . ).

A well known application of video fingerprinting is the detection of pirate copies of document. But since video fingerprinting provides a reliable way of identifying 2 similar documents, it has many other applications including detecting doubles into a video collection or retrieving a clip within a complete edited document.

These applications are different form pure visual similarity based application which typically support "query by content": They aim at retrieving 2 copies that match almost exactly.

Fingerprinting technology relies on the extraction of descriptive information from the content that can be efficiently handled by specific search applications. This descriptive information can be stored into metadata so that they are immediately available for searching without the need to decompress and analyzing the video content.

According to the preferred embodiment, the video data are encoded according to ITU-T H.264 standard. The fingerprint information is encapsulated into SEI messages as defined in the next table.

TABLE 2

| fingerprint_metadata ( ) { | C | Descriptor |
|---|---|---|
| Reference frame (timecode) | | b(8)b(8)b(8) b(4) |
| Fingerprint algorithm Index | | b(8) |
| N Number of items in the fingerprint | | Unsigned int (16) |
| (typically corresponds to number of | | |
| keypoints - point of interest). | | |
| for( i = 0 i < N, i++ ) { | | |
|   Dim | | Unsigned int (16) |
|   Dimension of each element of DATA | | |
|   (for e.g histogram of luminance | | |
|   DIM=256) | | |
|   Format | | b(8) |
|   Format of each element of DATA | | |
|   ( char, short int, float | | |
|   for( i = 0 i < Dim, i++ ) { | | |
|     DATA: | | b(8) or u(16) or |
|     data fingerprint. DATA={DATA(i)} | | f(32) |
|     i=1..N. Each DATA(i) is an | | |
|     element of the fingerprint. | | |
|   } | | |
| } | | |

A fingerprint SEI message can appear at any location in the stream. There can be any number of such messages, at most one per frame. There will be typically one fingerprint message per shot.

A fingerprint message specifies the exact frame it is associated with and called reference frame in the table 2 (from which it has been extracted). This is required by fingerprint checking mechanism which needs to take temporal constraints into account.

A timecode is described in the following manner: hour, minute, second, frame number respective to the embedding document. Represented by 3 bytes and 1 nibble: b(8), b(8), b(8), n(4), If the document is edited, this metadata will have to be regenerated.

"Fingerprint algorithm Index" is the index of the video fingerprint algorithm used to describe this frame. Some different video fingerprint algorithms can be used to describe a frame, a shot.

In case two videos fingerprinting have been extracted by two different algorithms, direct fingerprint comparison is impossible.

Inside the syntax definition, u(n) represents unsigned integer using n bits and b(8) represents byte having any pattern of bit string (8 bits), payloadSize is the size in bytes of the whole video_annotation_SEI payload. No variable length coding is used here for the acceleration of fast bit stream parsing.

Both information of fingerprint and video structure can be combined in a high level SEI message comprising also other video annotation information.

For instance, the next table can propose a SEI message structure comprising several types of metadata related to the video annotation.

| video_annotation_SEI (payloadSize) { | C | Descriptor |
|---|---|---|
| metadataType | 5 | u(8) |
| if (metadataType & 0x01 == 0x01) | | |
| text_metadata (payloadSize) | 5 | |
| if (metadataType & 0x02 == 0x02) | | |
| motion_metadata ( ) | 5 | |
| if (metadataType & 0x04 == 0x04) | | |
| colour_metadata ( ) | 5 | |
| if (metadataType & 0x08 == 0x08) | | |
| texture_metadata ( ) | 5 | |
| if(metadataType & 0x10 == 0x10) | | |
| fingerprint_metadata ( ) | 5 | |
| if(metadataType & 0x10 == 0x12) | | |
| structure_metadata ( ) | 5 | |
| } | | |

Without departing from the scope of the invention, it concerns also a video encoding device comprising
means for determining the structure of the video data,
means for splitting said structure into chunks in an incremental manner,
means for inserting said chunks in the data stream at time intervals before the video data it is related to.

Preferably, this encoding device is compliant with ITU-T H.264 standard and that said structure information is encapsulated into a Supplemental Enhancement Information (SEI) message.

The invention concerns also a video encoding device comprising
means for determining fingerprint associated with at least one frame of said video data,
means for inserting at least a message into the video stream comprising said fingerprint information.

Preferably this encoding device is compliant with ITU-T H.264 standard and that said fingerprint information is encapsulated into a Supplemental Enhancement Information (SEI) message.

The invention concerns also a personal video recorder comprising:
means for decoding encoded video information,
means for decoding associated video data structure inserted into the encoded video data in a incremental manner,
means to rebuild the video data structure thanks to the incremental video data structure received on the fly.

The invention concerns also a personal video recorder comprising:
means for decoding encoded video information,
means for decoding fingerprint information comprised into the encoded video data,
means for storing received encoded video data,
means to compare a plurality of recorded video data based on their fingerprint information.

The invention claimed is:

1. A method, comprising:
determining a structure of video data content to be transmitted;
splitting said structure into chunks in a hierarchical manner, wherein each said chunk comprises one or more nodes representing metadata for a respective portion of said video data content, a first said chunk comprises a first description of said one or more nodes included in said first chunk and a second said chunk comprises information indicating that a second description of said one or more nodes included in said second chunk is included in a next chunk, said first and second descriptions each comprising one or more node identifiers, a name representing video information in which said one or more nodes is associated, and a timecode indicating a duration of said video information; and
transmitting said chunks in a data stream at successive time intervals such that each said chunk is transmitted before said respective portion of said video data content said chunk is related to.

2. The method according to claim 1 wherein:
each said node comprises a plurality of leaves; and
each said chunk comprises a plurality of nodes and leaves.

3. The method according to claim 1 wherein:
said video data content is encoded to produce encoded video data; and
said chunks are encapsulated into messages in said encoded video data.

4. The method according to claim 3 wherein:
said video data content comprises coded metadata compliant with an ITU-T H.264 standard; and
said metadata is transmitted into at least a Supplemental Enhancement Information (SEI) message.

5. The method according to claim 1 wherein said descriptions each further comprises:
one or more summary segments, and for each said summary segment:
a name representing said summary segment;
a category representing semantic information associated with said summary segment; and
a key description describing a type of segment chosen among a keyframe, a clip or a textual description.

6. A device, comprising:
a processor configured for:
determining a structure of video data content to be transmitted;
splitting said structure into chunks in a hierarchical manner, wherein each said chunk comprises one or more nodes representing metadata for a respective portion of said video data content, a first said chunk comprises a first description of said one or more nodes included in said first chunk and a second said chunk comprises information indicating that a second description of said one or more nodes included in said second chunk is included in a next chunk, said first and second descriptions each comprising one or more node identifiers, a name representing video information in which said one or more nodes is associated, and a timecode indicating a duration of said video information; and
inserting said chunks in a data stream at successive time intervals such that each said chunk is inserted before said respective portion of said video data content said chunk is related to.

7. The device according to claim 6 wherein:
each said node comprises a plurality of leaves; and
each said chunk comprises a plurality of nodes and leaves.

8. The device according to claim 6 wherein:
said video data content is encoded to produce encoded video data; and
said chunks are encapsulated into messages in said encoded video data.

9. The device according to claim 8 wherein:
said video data content comprises coded metadata compliant with an ITU-T H.264 standard; and
said metadata is transmitted into at least a Supplemental Enhancement Information (SEI) message.

10. The device according to claim 6 wherein said descriptions each further comprises:
one or more summary segments, and for each said summary segment:
a name representing said summary segment;
a category representing semantic information associated with said summary segment; and
a key description describing a type of segment chosen among a keyframe, a clip or a textual description.

11. A video decoding device, comprising:
a processor configured for:
decoding encoded video data content and metadata associated with said encoded video data content, wherein said encoded video data content has a structure split into chunks in a hierarchical manner where each said chunk comprises one or more nodes representing metadata for a respective portion of said encoded video data content, a first said chunk comprises a first description of said one or more nodes included in said first chunk and a second said chunk comprises information indicating that a second description of said one or more nodes included in said second chunk is included in a next chunk, said first and second descriptions each comprising one or more node identifiers, a name representing video information in which said one or more nodes is associated, and a timecode indicating a duration of said video information, wherein said chunks are positioned in a data stream at successive time intervals such that each said chunk is positioned before said respective portion of said encoded video data content said chunk is related to; and
rebuilding said structure of said encoded video data content in response to receiving said data stream.

12. The video decoding device according to claim 11 wherein:
each said node comprises a plurality of leaves; and
each said chunk comprises a plurality of nodes and leaves.

13. The video decoding device according to claim 11 wherein:
said video data content is encoded to produce encoded video data; and
said chunks are encapsulated into messages in said encoded video data.

14. The video decoding device according to claim 13 wherein:
said video data content comprises coded metadata compliant with an ITU-T H.264 standard; and
said metadata is transmitted into at least a Supplemental Enhancement Information (SEI) message.

15. The video decoding device according to claim 11 wherein said descriptions each further comprises:
one or more summary segments, and for each said summary segment:
a name representing said summary segment;
a category representing semantic information associated with said summary segment; and
a key description describing a type of segment chosen among a keyframe, a clip or a textual description.

16. A video decoding method, comprising:
decoding encoded video data content and metadata associated with said encoded video data content, wherein said encoded video data content has a structure split into chunks in a hierarchical manner where each said chunk comprises one or more nodes representing metadata for a respective portion of said encoded video data content, a first said chunk comprises a first description of said one or more nodes included in said first chunk and a second said chunk comprises information indicating that a second description of said one or more nodes included in said second chunk is included in a next chunk, said first and second descriptions each comprising one or more node identifiers, a name representing video information in which said one or more nodes is associated, and a timecode indicating a duration of said video information, wherein said chunks are positioned in a data stream at successive time intervals such that each said chunk is positioned before said respective portion of said encoded video data content said chunk is related to; and
rebuilding said structure of said encoded video data content in response to receiving said data stream.

17. The video decoding method according to claim 16 wherein:
each said node comprises a plurality of leaves; and
each said chunk comprises a plurality of nodes and leaves.

18. The video decoding method according to claim 16 wherein:
said video data content is encoded to produce encoded video data; and
said chunks are encapsulated into messages in said encoded video data.

19. The video decoding method according to claim 18 wherein:
said video data content comprises coded metadata compliant with an ITU-T H.264 standard; and
said metadata is transmitted into at least a Supplemental Enhancement Information (SEI) message.

20. The video decoding method according to claim 16 wherein said descriptions each further comprises:

one or more summary segments, and for each said summary segment:

a name representing said summary segment;

a category representing semantic information associated with said summary segment; and a key description describing a type of segment chosen among a keyframe, a clip or a textual description.

\* \* \* \* \*